(12) United States Patent
Blair et al.

(10) Patent No.: US 11,403,920 B2
(45) Date of Patent: *Aug. 2, 2022

(54) MULTI-PURPOSE KIOSK AND METHODS

(71) Applicant: The Western Union Company, Denver, CO (US)

(72) Inventors: Paul A. Blair, Parker, CO (US); Kenneth Algiene, Littleton, CO (US); Mark Thompson, Parker, CO (US)

(73) Assignee: The Western Union Company, Denver, CO (US)

( * ) Notice: Subject to any disclaimer, the term of this patent is extended or adjusted under 35 U.S.C. 154(b) by 322 days.

This patent is subject to a terminal disclaimer.

(21) Appl. No.: 16/450,605

(22) Filed: Jun. 24, 2019

(65) Prior Publication Data

US 2019/0311584 A1   Oct. 10, 2019

Related U.S. Application Data

(63) Continuation of application No. 10/225,410, filed on Aug. 20, 2002, now Pat. No. 10,395,484.

(51) Int. Cl.
*G06Q 20/10* (2012.01)
*G07F 19/00* (2006.01)
*G06Q 20/14* (2012.01)

(52) U.S. Cl.
CPC ............. *G07F 19/20* (2013.01); *G06Q 20/10* (2013.01); *G06Q 20/102* (2013.01);
(Continued)

(58) Field of Classification Search
CPC ................................ G06F 17/60; G06Q 20/10
(Continued)

(56) References Cited

U.S. PATENT DOCUMENTS 3,783,755 A   1/1974   Lagin
3,833,395 A   9/1974   Gosnell
(Continued)

FOREIGN PATENT DOCUMENTS

EP   0481135 A1   4/1992
EP   0911772 A2   4/1999
(Continued)

OTHER PUBLICATIONS

U.S. Appl. No. 10/225,410, "Final Office Action", dated Sep. 9, 2013, 11 pages.
(Continued)

*Primary Examiner* — Ojo O Oyebisi
(74) *Attorney, Agent, or Firm* — Kilpatrick Townsend & Stockton LLP

(57) ABSTRACT

A method of using a kiosk to dispense funds, a portion of which has a value less than the value of the lowest form of currency the kiosk dispenses. The method may include receiving information at the kiosk identifying a source for the funds and transmitting a request to a host computer to verify the source for the funds. The method may include receiving at the kiosk a verification of the funds and displaying on a display screen an amount of funds available for payment. The method may include receiving at the kiosk a request from a user to remit a first portion of the amount of funds in a first form, wherein the first form is selected from a group consisting of paper currency, money order, credit to an account, and credit to a stored value card. The method may include remitting the first portion in the first form and displaying a set of options for receiving a second portion of the amount of funds, wherein the set of options is selected from a group consisting of a money order, a donation, a credit to a stored value card, and a credit to an account. The method may include receiving a request from the user to
(Continued)

remit the second portion of the amount of funds in a second form selected from the set of options. The first form and the second form may be different, and the kiosk may be configured to dispense money orders upon receipt of a request from the user to remit the first portion as a money order.

20 Claims, 6 Drawing Sheets

(52) U.S. Cl.
CPC ......... *G06Q 20/1085* (2013.01); *G06Q 20/14* (2013.01); *G07F 19/203* (2013.01)

(58) Field of Classification Search
USPC .......................................................... 705/43
See application file for complete search history.

(56) References Cited

U.S. PATENT DOCUMENTS

| | | |
|---|---|---|
| 4,523,087 A | 6/1985 | Benton |
| 4,722,554 A | 2/1988 | Petit |
| 4,758,714 A | 7/1988 | Carlson et al. |
| 5,021,967 A | 1/1991 | Smith |
| 5,220,501 A | 6/1993 | Lawlor et al. |
| 5,299,295 A | 3/1994 | Kim et al. |
| 5,425,355 A | 6/1995 | Kulick |
| 5,426,594 A | 6/1995 | Wright et al. |
| 5,461,217 A | 10/1995 | Claus |
| 5,477,037 A | 12/1995 | Berger |
| 5,491,325 A | 2/1996 | Huang et al. |
| 5,513,117 A | 4/1996 | Small |
| 5,555,496 A | 9/1996 | Tackbary et al. |
| 5,570,465 A | 10/1996 | Tsakanikas |
| 5,622,388 A | 4/1997 | Alcordo |
| 5,650,604 A | 7/1997 | Marcous et al. |
| 5,691,525 A | 11/1997 | Aoki et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,745,886 A | 4/1998 | Rosen |
| 5,757,917 A | 5/1998 | Rose et al. |
| 5,774,879 A | 6/1998 | Custy et al. |
| 5,790,793 A | 8/1998 | Higley |
| 5,826,241 A | 10/1998 | Stein et al. |
| 5,870,718 A | 2/1999 | Spector |
| 5,875,435 A | 2/1999 | Brown |
| 5,893,080 A | 4/1999 | McGurl et al. |
| 5,896,298 A | 4/1999 | Richter |
| 5,898,154 A | 4/1999 | Rosen |
| 5,909,673 A | 6/1999 | Gregory |
| 5,920,629 A | 7/1999 | Rosen |
| 5,940,844 A | 8/1999 | Cahill et al. |
| 5,949,044 A | 9/1999 | Walker et al. |
| 5,953,709 A | 9/1999 | Gilbert et al. |
| 5,954,194 A | 9/1999 | Simpson |
| 5,960,412 A | 9/1999 | Tackbary et al. |
| 5,971,273 A | 10/1999 | Vallaire |
| 5,987,439 A | 11/1999 | Gustin et al. |
| 5,993,047 A | 11/1999 | Novogrod et al. |
| 6,011,833 A | 1/2000 | West |
| 6,012,048 A | 1/2000 | Gustin et al. |
| 6,015,087 A | 1/2000 | Seifert et al. |
| 6,029,150 A | 2/2000 | Kravitz |
| 6,030,000 A | 2/2000 | Diamond |
| 6,032,133 A | 2/2000 | Hilt et al. |
| 6,044,360 A | 3/2000 | Picciallo |
| 6,045,039 A | 4/2000 | Stinson et al. |
| 6,058,417 A | 5/2000 | Hess et al. |
| 6,064,990 A | 5/2000 | Goldsmith |
| 6,070,798 A | 6/2000 | Nethery |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Mersky et al. |
| 6,119,931 A | 9/2000 | Novogrod |
| 6,122,625 A | 9/2000 | Rosen |
| 6,145,738 A | 11/2000 | Stinson et al. |
| 6,149,055 A | 11/2000 | Gatto |
| 6,149,056 A | 11/2000 | Stinson et al. |
| 6,175,823 B1 | 1/2001 | Van Dusen |
| 6,193,155 B1 | 2/2001 | Walker et al. |
| 6,223,168 B1 | 4/2001 | McGurl et al. |
| 6,226,623 B1 | 5/2001 | Schein et al. |
| 6,246,996 B1 | 6/2001 | Stein et al. |
| 6,286,756 B1 | 9/2001 | Stinson et al. |
| 6,292,789 B1 | 9/2001 | Schutzer |
| 6,308,887 B1 | 10/2001 | Korman et al. |
| 6,321,211 B1 | 11/2001 | Dodd |
| 6,367,693 B1 | 4/2002 | Novogrod |
| 6,370,514 B1 | 4/2002 | Messner |
| 6,360,254 B1 | 5/2002 | Linden et al. |
| 6,453,300 B2 | 9/2002 | Simpson |
| 6,473,500 B1 | 10/2002 | Risafi et al. |
| 6,488,203 B1 | 12/2002 | Stoutenburg et al. |
| 6,510,453 B1 | 1/2003 | Apfel et al. |
| 6,814,282 B2 | 11/2004 | Seifert et al. |
| 7,089,208 B1 | 8/2006 | Levchin et al. |
| 7,120,606 B1 | 10/2006 | Ranzini et al. |
| 7,130,817 B2 | 10/2006 | Karas et al. |
| 7,266,533 B2 | 9/2007 | Karas et al. |
| 7,752,132 B2 | 7/2010 | Stewart et al. |
| 7,769,686 B2 | 8/2010 | Hansen et al. |
| 10,395,484 B2 | 8/2019 | Blair et al. |
| 2001/0051876 A1 | 12/2001 | Seigel et al. |
| 2001/0054003 A1 | 12/2001 | Chien et al. |
| 2002/0046106 A1 | 4/2002 | Ishibashi et al. |
| 2002/0082962 A1* | 6/2002 | Farris ................... G07F 19/202 705/35 |
| 2002/0082993 A1 | 6/2002 | Hoyos et al. |
| 2002/0087463 A1 | 7/2002 | Fitzgerald et al. |
| 2002/0138636 A1 | 9/2002 | Karas et al. |
| 2004/0039702 A1 | 2/2004 | Blair et al. |
| 2004/0169722 A1 | 9/2004 | Pena |

FOREIGN PATENT DOCUMENTS

| | | |
|---|---|---|
| EP | 0949596 A2 | 10/1999 |
| EP | 1077436 A2 | 2/2001 |
| NL | 9401298 | 5/1995 |
| WO | 00/22559 A1 | 4/2000 |
| WO | 00/46725 A1 | 8/2000 |
| WO | 00/67177 A2 | 11/2000 |
| WO | 00/70517 A2 | 11/2000 |
| WO | 01/04816 A1 | 1/2001 |
| WO | 0139093 A1 | 5/2001 |
| WO | 01/41419 A1 | 6/2001 |
| WO | 02/05195 A1 | 1/2002 |
| WO | 02/11028 A1 | 2/2002 |
| WO | 02/48839 A2 | 6/2002 |

OTHER PUBLICATIONS

U.S. Appl. No. 10/225,410 , "Final Office Action", dated May 9, 2014, 5 pages.
U.S. Appl. No. 10/225,410 , "Final Office Action", dated Mar. 3, 2015, 7 pages.
U.S. Appl. No. 10/225,410 , "Non Final Office Action", dated Feb. 5, 2014, 5 pages.
U.S. Appl. No. 10/225,410 , "Non-Final Office Action", dated Oct. 10, 2014, 6 Pages.
U.S. Appl. No. 10/225,410 , "Non-Final Office Action", dated Jul. 27, 2018, 8 pages.
U.S. Appl. No. 10/225,410 , "Notice of Allowance", dated Mar. 6, 2019, 10 pages.
U.S. Appl. No. 10/225,410 , "Office Action", 10.
U.S. Appl. No. 10/225,410 , "Office Action", dated Feb. 22, 2013, 10 Pages.

(56) References Cited

OTHER PUBLICATIONS

U.S. Appl. No. 10/225,410, "Response to Office Action", 14.
U.S. Appl. No. 11/388,539, "Final Office Action", dated Dec. 27, 2013, 15 Pages.
U.S. Appl. No. 11/388,539, "Non Final Office Action", dated Jun. 5, 2013, 13 pages.
U.S. Appl. No. 11/388,539, "Office Action", dated Feb. 21, 2013, pp. 12.
Business/Technology/Entertainment Editors, "Flashcards.com Launches With Dynamic New Form Of Cutting-Edge Online Greeting Cards & Invitations," Business Wire, 2 pages, Jul. 24, 2000.
Kaufman, Leslie, "Excite@Home To Acquire Bluemountain," New York Times (Late Edition (East Coast)), 3 pages, Oct. 26, 1999.
Bank Network News, "ATMs Give Wire Transfers A Run For The Money," vol. 16, Iss. 17, 3 pages, Jan. 28, 1998.
Bank Network News, "Banks Turn To Debit To Drive Fund Transfers," vol. 18, No. 20, 5 pages, Mar. 16, 2000.
Business Wire, "E-Commerce, Email And E-Greeting Cards Combine In New Web Site Designed By Interactive Bureau, Flooz.com Features A Fun Online Gift Currency You Send By Email For Any Occasion," 2 pages, Sep. 14, 1999.
Confinity, Inc., "How PayPal.com Works," http://www.paypal.com/cgi-bin/webscr?cmd=paypal-works, 2 pages, 2000.
DotBank by Arthas Corp., "The Way To Send And Receive Money On The Internet," http://www.dotbank.com, 7 pages, 1999.
Idealab, "payme.com," https://ssl.idealab.com, 7 pages, downloaded on Feb. 16, 2000.
Karpinski, Richard, "Web Merchants Try Debit Cards And Gift Certificates To Spur Sales," InternetWeek, 2 pages, Oct. 11, 1999.
Kolor, Joanna, "A New Era Of ATMs Breeds Much More Than Cash," Bank Technology News, vol. 9, No. 10, 7 pages, Oct. 1996.
Landry, Susan M., "The Echeck Market Trial: An Update," TMA Journal, pp. 23-25, Jan./Feb. 1999.
PR Newswire, GiftSpot.com Simplifies Gift-Giving On The Internet, 5 pages, Oct. 20, 1999.
Redman, Russell, "Western Union, EDS Plan Cash Transfers Via ATMs," Bank Systems & Technology, vol. 35, Iss. 8, 3 pages, Aug. 1998.
Russo, Ed, "Omaha's Giftpoint.com Draws $5 Million Investment," Omaha World—Herald, 2 pages, Dec. 14, 1999.
Troy, Mike, "Cards: E-Greetings Break The Mold, Redefine The Industry," Discount Store News, vol. 38, Iss. 23, 3 pages, Dec. 13, 1999.
Walker, Leslie, "Click A Card," The Washington Post, 3 pages, Dec. 16, 1999.
X.com, "Do More With Your Money," http://www.x.com, 5 pages, downloaded on Feb. 7, 2000.

* cited by examiner

MULTI-PURPOSE KIOSK AND METHODS

CROSS-REFERENCES TO RELATED APPLICATIONS

This application is a continuation of U.S. patent application Ser. No. 10/225,410, entitled "MULTI-PURPOSE KIOSK AND METHODS," filed on Aug. 20, 2002, which is herein incorporated by reference in its entirety for all purposes.

This application is also related to U.S. patent application Ser. No. 09/737,912, entitled, "ONLINE METHOD AND SYSTEM FOR ORDERING AND HAVING DELIVERED A PAPER GREETING MESSAGE AND PAYMENT INSTRUMENT", filed on Dec. 15, 2000, now abandoned, and to U.S. patent application Ser. No. 10/010,068, entitled, "ELECTRONIC GIFT GREETING," filed on Dec. 6, 2001, and issued as U.S. Pat. No. 7,266,533, and to U.S. Provisional Patent Application No. 60/346,363, entitled, "METHODS AND SYSTEMS FOR PROCESSING MONEY-ORDER REQUESTS," filed on Jan. 4, 2002, and to U.S. patent application Ser. No. 09/955,747, entitled, "METHOD AND SYSTEM FOR TRANSFERRING STORED VALUE," filed on Sep. 18, 2001, and issued as U.S. Pat. No. 7,769,686, and to U.S. patent application Ser. No. 10/040,568, entitled, "SYSTEMS AND METHODS OF INTRODUCING AND RECEIVING INFORMATION ACROSS A COMPUTER NETWORK," filed on Jan. 4, 2002, and issued as U.S. Pat. No. 6,814,282, which are herein incorporated by reference in their entirety for all purposes.

BACKGROUND OF THE INVENTION

The present invention relates generally to financial transactions. The present invention relates more specifically to systems and methods for sending and receiving value using unmanned financial transaction kiosks.

Third party money transfer services are well known, one example of which is the service provided by Western Union, a subsidiary of First Data Corporation of Greenwood Village, Colo. The services are used extensively by the unbanked to transfer money and pay bills through the use of wire transfers and money orders. However, the use of such services usually require face-to-face contact between an individual representing the third party service provider and the sender and/or the receiver. For example, if a sender is "wiring" money to a receiver, the money is typically deposited with the third party in person, and the sender typically obtains the money from the third party in person. If the money is transferred in the form of a money order, the sender typically deposits the money with the third party in person and receives a money order.

In order to provide customers convenient access to money transfer services, companies that provide such services often establish agency relationships with businesses such as stores, banks, and the like. As an agent, these business then act on behalf of the transfer service to receive funds from senders and dispense funds to receivers, for which the agent receives compensation. Methods are needed that allow money transfer service providers to provide customers convenient access to their services with less dependency on agents.

BRIEF SUMMARY OF THE INVENTION

Embodiments of the present invention thus provide a method of using a kiosk to dispense funds. The method includes receiving information at the kiosk identifying a source for the funds and transmitting a request to a host computer to verify the source for the funds. The method also includes receiving at the kiosk a verification of the funds and displaying on a display screen an amount of funds available for payment. The method also includes receiving at the kiosk a request from a user to remit a first portion of the amount of funds in a first form. The first form may be selected from a group consisting of paper currency, money order, credit to an account, and credit to a stored value card. The method also includes remitting the first portion in the first form and displaying a set of options for receiving a second portion of the amount of funds. The set of options may be selected from a group consisting of a money order, a donation, a credit to a stored value card, and a credit to an account. The method also includes receiving a request from the user to remit the second portion of the amount of funds in a second form, wherein the second form is selected from the set of options. The first form and the second form may be different and the kiosk may be configured to dispense money orders upon receipt of a request from the user to remit the first portion as a money order.

The first portion may be a number of whole dollars of the amount and the second portion may be a number of cents of the amount. The source for the funds may be a wire transfer to the user. The source for the funds may be an account, and the method may include reading account information from a card to identify the source for the funds. The source for the funds may be a check, and the method may include receiving the check from the user.

In another embodiment, a method of using a kiosk to initiate a transaction to send funds along with a greeting includes receiving information at the kiosk relating to a source for the funds and receiving at the kiosk from the user information identifying a recipient of the funds. The method includes displaying on a display screen of the kiosk a summary of the transaction and receiving at the kiosk information relating to the creation of a message to the recipient of the funds. The method may include receiving an amount of funds at the kiosk from a user. The means for receiving the funds may be selected from the group consisting of reading information from a card possessed by the user, receiving cash, receiving a check, receiving a wire transfer directed to the user, and receiving a money order. Receiving information relating to the creation of a gift message may include receiving information relating to an occasion and receiving information relating to a design based on the occasion. Receiving information relating to the creation of a gift message may include recording an audio portion of a greeting. Receiving information relating to the creation of a gift message may include recording a video portion of the greeting. Receiving information relating to the creation of a gift message may include transmitting a file containing the gift message to a server computer. The gift message may include the audio portion of the greeting, the video portion of the greeting, and data that associates the gift message to the transaction.

In yet another embodiment, a method of using a kiosk to exchange value among value accounts includes receiving information relating to a first value account and displaying on a display screen of the kiosk an amount of value available for exchange from the first value account. The method also includes receiving at the kiosk an amount of value to be transferred and receiving information relating to a second value account. The method may include sending a message to a value exchange server to transfer the amount from the first value account to the second value account. The first value account may represent value in a first form and the second value account may represent value in a second form. The first form and the second form may be different. The method may include sending a request to the value exchange server to transmit the exchange rate for value between the first and second value accounts. Receiving information relating to a first value account may include reading information from a value card while the value card is swiped by a user. The value card may represent the first account.

A method of using a kiosk to receive funds includes receiving information from a user identifying a source for the funds and transmitting a request to a server computer to verify the source for the funds and an amount of funds available. The method also includes presenting a message from the sender of the funds to the user. The method may include displaying a set of options from which the user may choose the form in which to receive the funds and receiving a request from the user to receive the funds in a particular form. The method may include remitting the funds in the form requested by the user. Presenting the gift card may include displaying a video portion of the gift card. Presenting the gift card may include playing an audio portion of the gift card.

In another embodiment, a multi-purpose kiosk includes means for providing two-way communication between a customer and a customer service representative and means for entering account information. The kiosk also includes means for remitting value to the customer and means for displaying account information. The kiosk also includes means for receiving value from the customer. Value may be selected from the group consisting of currency, coinage, money orders, a credit to a value card, and a credit to an account represented by a value card. The multi-purpose kiosk may include means for creating a gift message. The multi-purpose kiosk may include means for appreciating a gift message. The means for appreciating the gift message may be selected from the group consisting of a display screen, a speaker, and a printer.

In yet another embodiment, a multi-purpose kiosk includes a communication arrangement that provides two-way communication between a customer and a customer service representative and a value dispenser configured to dispense value to the customer. The kiosk also includes a value receiver configured to receive value from the customer. Value may be selected from the group consisting of currency, coinage, money orders, a credit to a value card, and a credit to an account represented by a value card. The multi-purpose kiosk may include an input device that enables the customer to create a gift message. The multi-purpose kiosk may include a multi-media output device that enables the customer to appreciate a gift message. The means for appreciating the gift message may be selected from the group consisting of a display screen, a speaker, and a printer.

In yet another embodiment, a system for transferring value includes a host system that receives information relating to value to be transferred and at least one kiosk configured for communication with a host system. The kiosk may include a value dispenser configured to dispense value. The kiosk also may include a value receiver configured to receive value. The kiosk may include a communication arrangement that provides two-way communication between a customer and a customer service representative.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1A:
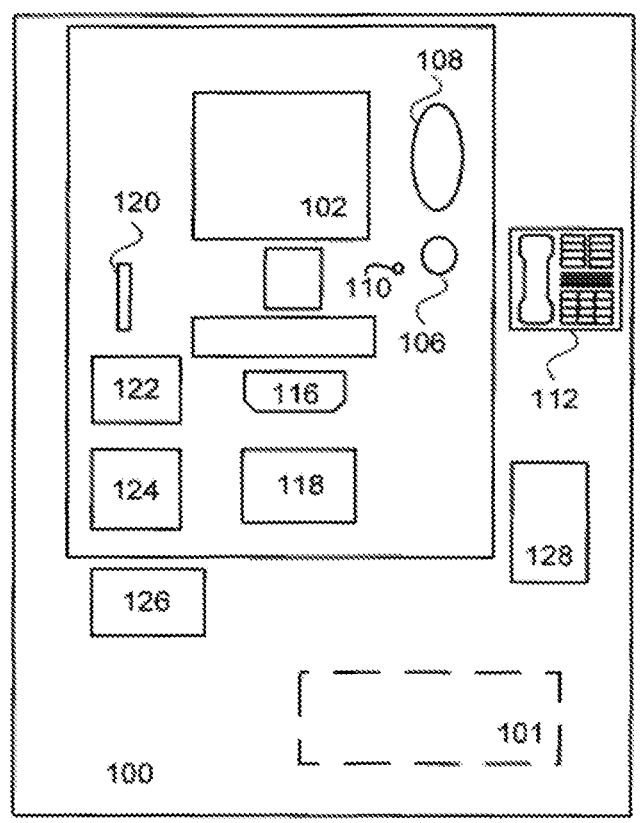
FIG. 1A illustrates a multi-purpose kiosk according to embodiments of the invention.

The present invention provides multi-purpose kiosks that allow money transfer service providers to reach more potential customers without the need for agents. The kiosks provide customers with means for communicating electronically with money transfer service providers or third party intermediaries, and allow the service providers to collect funds, verify identifications, dispense funds, and perform other necessary functions. Additionally, the kiosks may be equipped to provide services, such as, for example, sending greeting messages and exchanging value among value cards or accounts. Such multi-purpose kiosks and methods for using them are described in more detail below.

Herein, "value" refers to both monetary value and non-monetary value, such as long distance minutes, airline miles, customer loyalty points, and the like. "Value card" is used to refer to any of a wide variety of stored or representative value cards. Such cards include cash cards, smart cards, phone cards, point-of-purchase cards, and the like. Value cards may actually store the value on the cards themselves, or store account information relating to an account wherein the value is stored. Terminals such as hypercom terminals may be used to read account or value information from value cards.

FIG. 1 illustrates one example of a multi-purpose kiosk 100 according to embodiments of the invention. The kiosk 100 is presented as an illustration only, and this example should not be considered limiting. In light of the disclosure herein, many other examples of kiosks according to the present invention are apparent to those skilled in the art.

Kiosks, such as the multi-purpose kiosk 100, may be located wherever customers might obtain access to them. For example, shopping malls, airports, postal facilities, and the like, would all be ideal locations for such kiosks. Kiosks may be connected to a network, such as a telephone system, via a wire line or wireless connection. A computing device, such as a central processor 101, controls many of the functions of the kiosk.

The kiosk 100 includes a monitor 102 and a keypad 104. The monitor may include a touchscreen that allows users to enter information by touching buttons displayed on the screen. Alternatively or additionally, users may enter information using the keypad 104. The keypad 104 may contain both numbers and letters. Additionally, the keypad 104 may include special purpose buttons for selecting functions according to the invention.

The kiosk 100 also includes a camera 106, a speaker 108, and a microphone 110. The camera 106, speaker 108, and microphone 110 may be used to interact with a customer service representative, among other functions. The customer service representative's image may appear on the monitor 102. Alternatively or additionally, a telephone 112 may be used to interact with the customer service representative.

The kiosk 100 also includes a cash dispenser 114 and a coin dispenser 116. Some embodiments of the invention do not include the coin dispenser in favor of other alternatives for transacting in amounts less than the lowest denomination of paper currency used in conjunction with the kiosk, as will be described. A cash/check scanner 118 is provided for receiving funds in the form of currency or certain types of paper instruments. For example, an optical character reader, such as a MICR reader, may be used to read account information from checks, money orders, and other negotiable instruments. In addition, a card reader 120, such as a hypercom terminal, is provided for using any of a wide variety of currency exchange media. For example, the card reader 120 may read magnetic strips, such as those commonly found on credit and debit cards, customer loyalty cards, value cards, and the like. The card reader 120 may also read "chips," such as those associated with certain types of "smart cards." The card reader 120 may also read other types of currency exchange media, including infrared and radio frequency devices. For instance, a customer may be able to "beam" account information into the card reader 120 using an infrared transmitter associated with a PDA (personal digital assistant). Thus, reader 120 may perform any of a wide variety of reading functions. Additionally, the card reader 120 may be able to write information to value cards, and the like.

The kiosk 100 also includes a receipt printer 122, a money order printer 124, and a cash card dispenser 126. The receipt printer 122 provides users with receipts of transactions and other information, as will be explained in more detail hereinafter. The money order printer 124 prints money orders in amounts requested by users, as will be described. Examples of money order printers are described in more detail in U.S. Pat. No. 6,015,087, entitled "APPARATUS AND METHOD FOR ISSUING DOCUMENTS OF VALUE," which patent is incorporated herein by reference in its entirety, and in U.S. patent application Ser. No. 09/751,126, entitled "MONEY ORDER ENCASHMENT VIA THE FDX 400," filed on Dec. 28, 2000, by Earney Stoutenburg et al., which application is incorporated herein by reference. The cash card dispenser 126 dispenses cash cards, or other value cards, that may store value or store account information that users may use to access currency or other value. The cash card dispenser 126 may be used in combination with the card reader 120, wherein the cash card dispenser 126 dispenses value cards and the card reader 120 writes information to the value cards. The kiosk 100 may also contain holders such as marketing material holder 128 for educating users regarding the use of the kiosk 100, or to provide users with supplies needed in the course of conducting transactions using the kiosk 100.

Figure 1B:
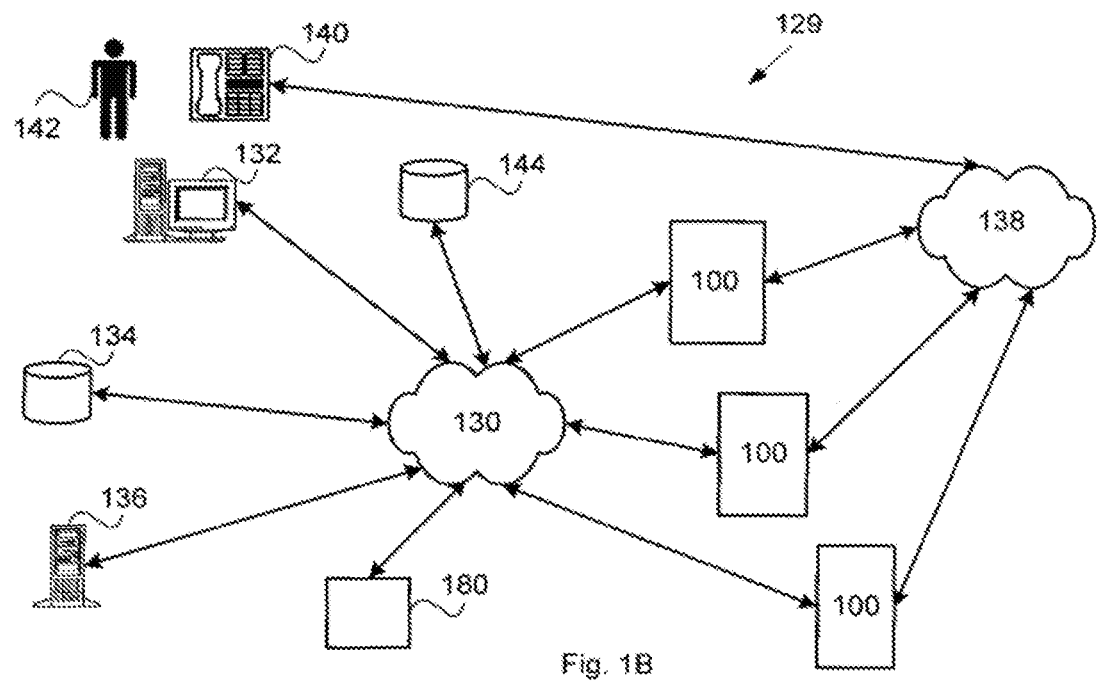
FIG. 1B illustrates a system for performing money transfers that includes kiosks, such as the kiosk of FIG. 1A.

FIG. 1A illustrates a system 129 within which one or more of kiosk 100 may be used. The system includes a plurality of kiosks 100, each connected to the other in an environment via a network 130. The network 130 may be any of a wide variety of networks, including, for example, a wide area network, a local area network, the Internet, and the like. The system also includes a computer 132 that may be used by a representative of a third party money (or other value) transfer service to access information relating to transactions within the system. Transaction information may be stored at, for example, a database 134. Additionally, the system may include an exchange server 136 for exchanging value represented in different units according to predetermined exchange rates, as will be described further hereinafter.

The kiosks 100 may also be connected to a second network, such as a telephone network 138. The telephone network 138 facilitates communication between the telephone 112 at each kiosk and a customer service representative telephone 140. Thus, a customer service representative 142 may communicate by telephone to a customer at a kiosk 100 and use the computer 132 to, for example, access information, authorize transactions, resolve problems, and the like. These and other functions of the system 129 will be described further below. It is also possible for the kiosk to use either the telephone network 138 or the network 130 exclusively for all communication.

Figure 2:
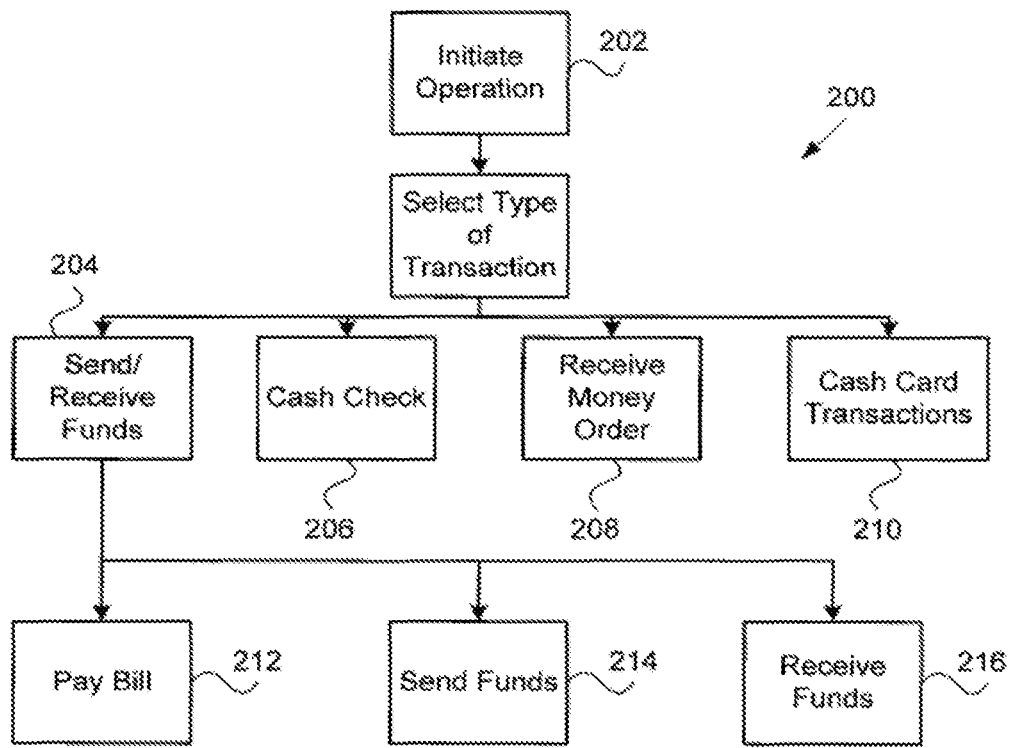
FIG. 2 illustrates a method of performing financial transactions according to embodiments of the invention, which method may use the kiosk of FIG. 1A.

FIG. 2 illustrates a method 200 for performing transactions using the kiosk 100 according to embodiments of the invention. As a user approaches, the kiosk 100 may be in a dormant, or passive, mode. For example, the kiosk 100 may have an advertising message appearing on the monitor 102. Alternatively, the kiosk 100 may be displaying a brief message to educate users on the use of the kiosk 100. In order to begin using the kiosk, the user may initiate operation of the kiosk 100 by, for example, touching the monitor 102, as indicated by operation 202. In response, a transaction menu screen may be displayed, providing a menu of functions from which the user may choose. Possible functions include, but are not limited to: sending and receiving funds 204; cashing a check 206; receiving a money order 208; and transacting using value accounts 210. Each of these functions will be explained in more detail hereinafter.

If the user selects to send or receive funds 204, a second function menu may be displayed having additional options. These may include, for example, pay bill 212, send funds 214 and receive funds 216, each of which will be explained further.

Figure 3:
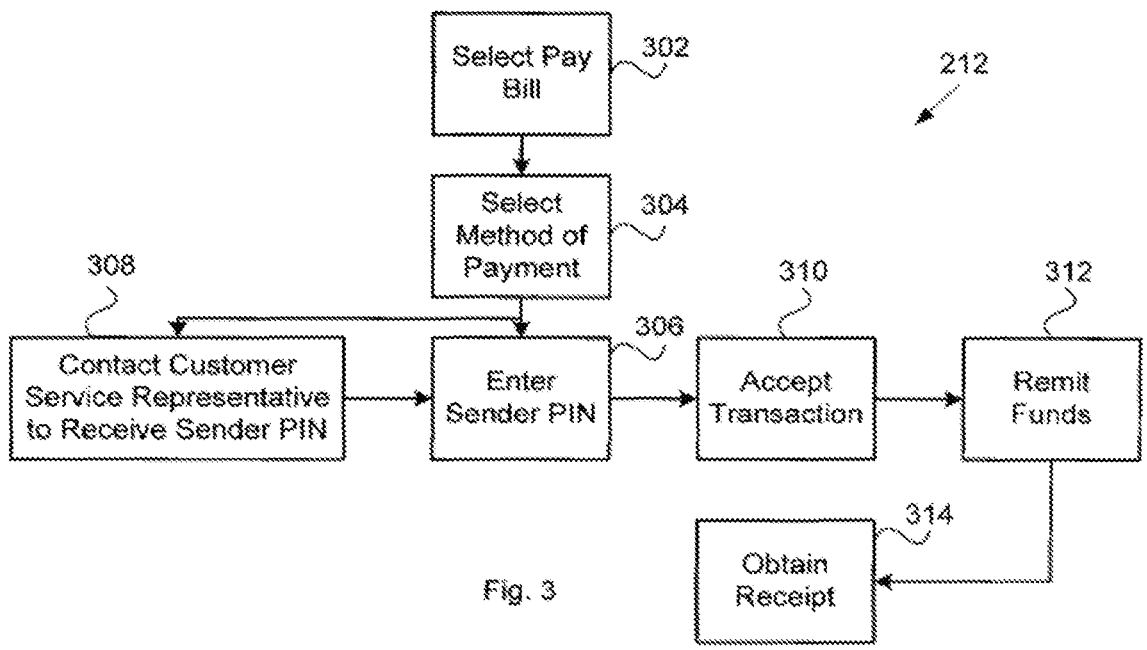
FIG. 3 illustrates a method of paying a bill according to embodiments of the invention, which method may use the kiosk of FIG. 1A.

FIG. 3 illustrates the pay bill option 212 in more detail. A user selects the pay bill option at operation 302. A display screen allows the user to select a method of payment. For example, the user may elect to pay using cash, debit or credit card, money order, check, stored or representative value card, and the like. Thus, the user selects a method of payment at operation 304. The user is then requested to enter a password, a sender PIN, account information, or the like at operation 306. If the user does not yet have a sender PIN or other appropriate information, the user may contact a customer service representative to obtain authorization at operation 308. The telephone 112 may be configured to auto-dial a customer service representative when the handset is lifted. Alternatively, the telephone 112 may have one or more speed-dial buttons that allow the user to contact a customer service representative. In some embodiments of the invention, the user may interact with a customer service representative using the monitor 102, camera 106, speaker 108, and microphone 110. The customer service representative gathers sufficient information from the user to complete the transaction and associate the transaction with a sender PIN, password or other identifier.

At operation 310, the kiosk may transmit an electronic file containing a summary of the transaction to a host computer for verification. Once the transaction is verified, the kiosk presents the user with a summary of the transaction, including any applicable service charges, and gives the user an opportunity to accept or cancel the transaction, also at operation 310. The user is then prompted to remit the funds necessary to complete the transaction at operation 312.

Many options are available for remitting funds. The user may insert cash or an acceptable check into the cash/check scanner 118 of the kiosk 100. Alternatively or additionally, the user may swipe a debit card, a credit card, or a stored or representative value card using the card reader 120, some of which may result in the user being prompted to enter a PIN associated with the card. If the user has received funds at the kiosk 100 (as will be explained in detail hereinafter), the user may use those funds to complete the transaction. Other means for remitting funds are possible. For example, the user may "beam" funds (i.e., account information representing funds) from a PDA into an infrared reader associated with, for example, the card reader 120. After the user remits sufficient funds, the kiosk may verify the funds and, if acceptable, provide the user with a receipt at operation 314, which may be printed by the receipt printer 122.

Figure 4:
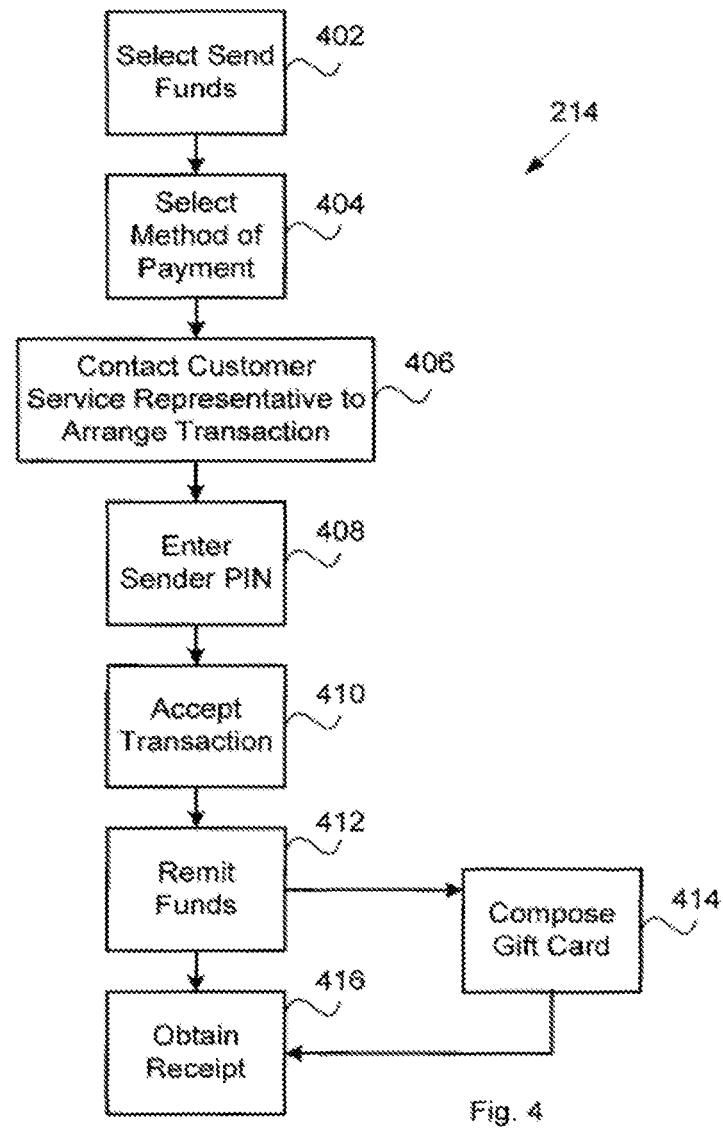
FIG. 4 illustrates a method of sending funds according to embodiments of the invention, which method may use the kiosk of FIG. 1A.

FIG. 4 illustrates the send funds option 214 in more detail. A user selects the send funds option at operation 402. At operation 404, the kiosk 100 prompts the user to select a method of payment. The kiosk 100 may be configured to accept any of a number of different types of payment, including, for example, cash, debit or credit card, money order, stored or representative value card, cash card, and/or funds received in a previous kiosk transaction. In response to the prompt, the user selects a method of payment. At operation 406, the user contacts a customer service representative to arrange a transaction and receive a sender PIN or other identifier. The user may provide the customer service representative with, for example, the name or other unique identifier of the recipient, the recipient's address, the amount of money to transfer, and/or the like. The user then enters the identifier at operation 408. The user may contact the customer service representative using the means previously discussed with reference to operation 308 of FIG. 3. At operation 410, the kiosk may verify the transaction, which may include communicating with a host computer, and provide the user with the opportunity to accept the transaction in response to a display screen that details the transaction and service charges. At operation 412, the user remits the necessary funds in a manner explained previously with reference to operation 312 of FIG. 3. Prior to completing the transaction, at operation 414 the user may compose a gift card to accompany the transaction. Composing a gift card will be explained in more detail immediately hereinafter. The transaction information is transmitted to a host computer or database, such as the database 134. The user may obtain a receipt of the transaction at operation 416.

Figure 5:
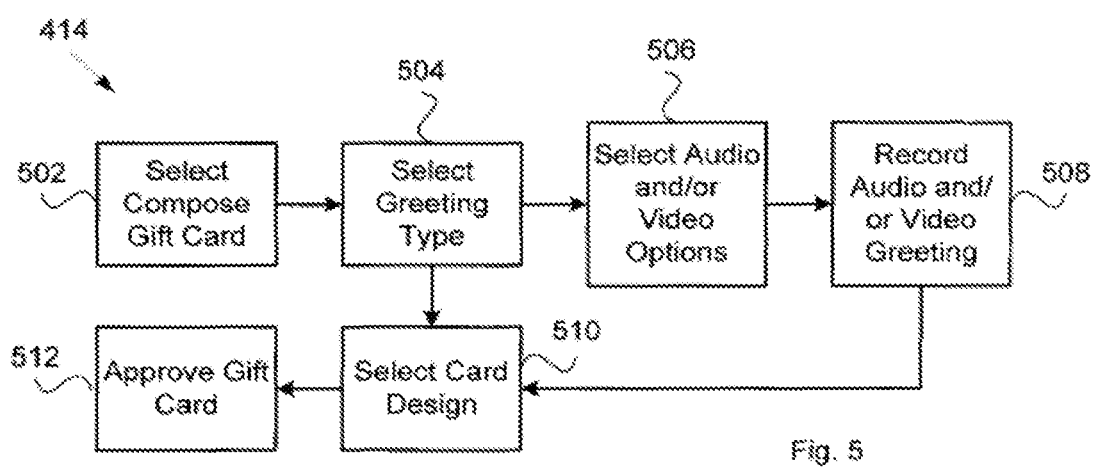
FIG. 5 illustrates a method of composing a gift message according to embodiments of the invention, which method may use the kiosk of FIG. 1A.

FIG. 5 illustrates the operation 414 of composing a gift card in more detail. Methods for including gift cards with money transfers are more fully explained in previously incorporated U.S. patent application Ser. No. 10/010,068, entitled, "ELECTRONIC GIFT GREETING". According to the present invention, a sender may include an electronic gift card with a money transfer initiated via the kiosk 100. The gift card may include a card design and greeting of the sender's choice. Additionally, the gift card may include audio and video greetings composed by the user at the kiosk 100 using, for example, the camera 106 and microphone 110. The audiovisual greeting may be observed by a receiver at a kiosk or through a web site, as will be described further below.

The user selects the option to compose a gift card at operation 502. At operation 504, the user selects a type of greeting (e.g., Happy Birthday, Merry Christmas, Congratulations, Get Well, etc.). At operation 506, the user selects whether to include audio and/or video greetings with the gift card. The video greeting may include, for example, a still photo, an animated video clip, live video clip, and/or the like. At operation 508 the user composes the audio and/or video portions of the greeting using the camera 106 and microphone 110. At operation 510, the user selects a card design, which the user may customize. At operation 512, the user approves the gift card, including the audiovisual portion, which is then transferred to a host computer or database to await delivery.

Figure 6:
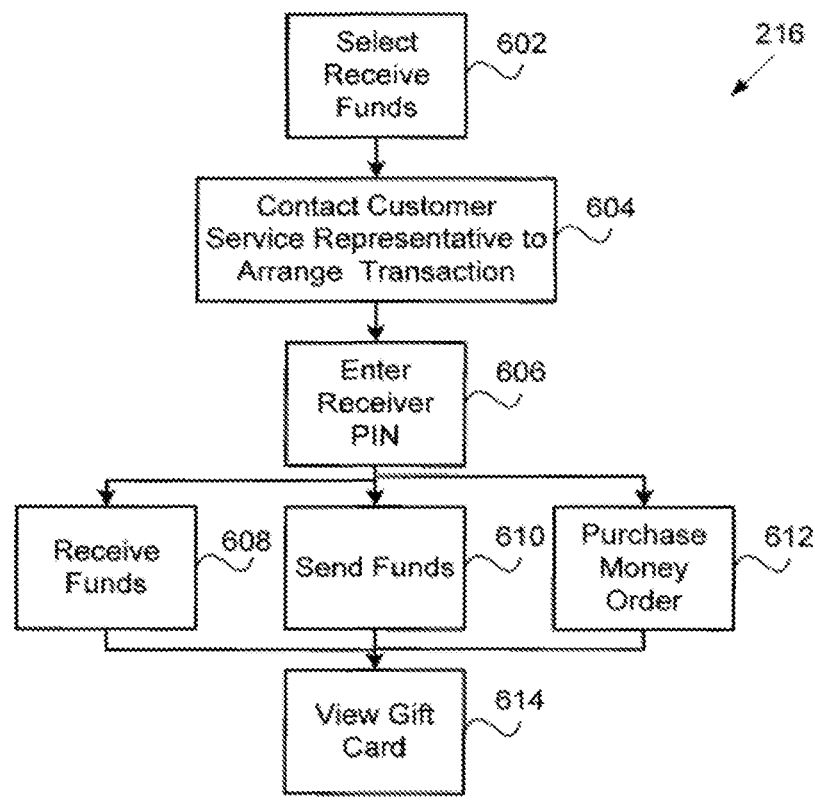
FIG. 6 illustrates a method of receiving funds according to embodiments of the invention, which method may use the kiosk of FIG. 1A.

FIG. 6 illustrates the receive funds option 216 in greater detail. At operation 602, the user selects the receive funds operation. At operation 604, the user contacts a customer service representative to obtain a receiver PIN. To obtain the receiver PIN, the receiver may be required to provide identifying information to the customer service representative. The information may include a unique security question designed to prevent unauthorized access to the funds. For example, the sender may provide the customer service representative and the receiver with a security question and answer, which the receiver must provide to the customer service representative in order to receive the receiver PIN. At operation 606, the receiver enters the receiver PIN. After verifying the transaction, which may include sending a file to a host computer and receiving a response, the kiosk presents the user with several options respecting what to do with the received funds. For example, the user may receive the funds 608, send the funds 610, pay a bill 212, or purchase a money order 612. If the transfer of funds includes a gift card, the user may view and/or hear the gift card at operation 614. Additionally or alternatively, the user may receive a web site address where the user may view the gift card and/or listen to the audio message using a personal computer to access the web site.

Figure 7:
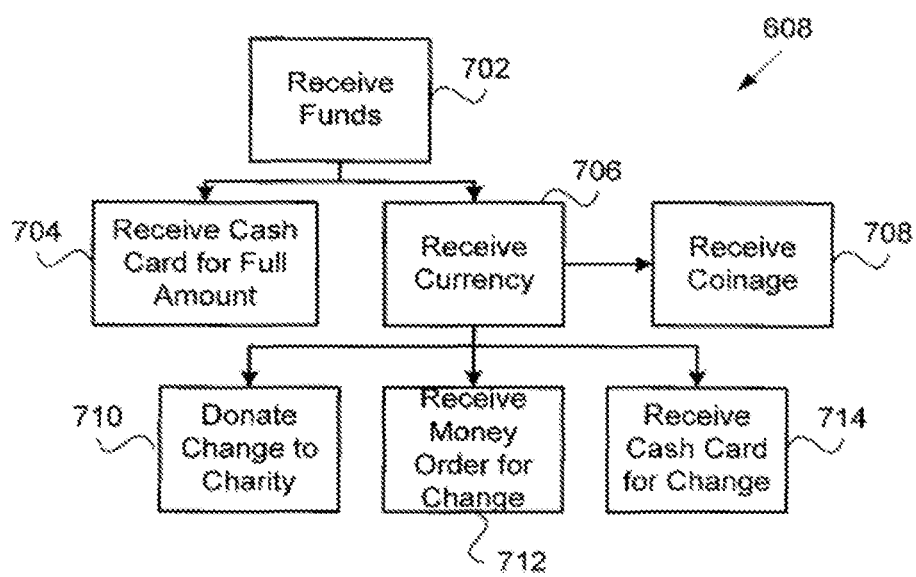
FIG. 7 illustrates a method of receiving value according to embodiments of the invention, which method may use the kiosk of FIG. 1A.

FIG. 7 illustrates the receive funds option 608 in greater detail. At operation 702, a user selects to receive the funds. The user may receive the funds as currency, or as a representation of currency on a stored of representative value card. By selecting the latter, the user may receive a cash card for the full amount of the transaction at operation 704. The cash card may be dispensed by the kiosk 100 via cash card printer 124. Alternatively, if the user already has a cash card or a stored or representative value card, the user may receive the funds on the existing card by swiping the card through the card reader 120. In some embodiments, the cash card printer 124 dispenses a blank card which the user swipes through the card reader 120 to establish the value associated with the card.

Alternatively, the user may elect to receive the funds in currency. The user receives the cash portion of the currency at operation 706. If the kiosk is so equipped, the user may receive the coinage portion of the funds at operation 708. If the kiosk is not equipped to dispense currency or if the user elects otherwise, the user may receive value representing the coinage in one of several ways. First, the user may elect to donate the coinage to charity at operation 710. In doing so, the user may be presented with a list of charities from which to select the recipient. Second, the user may receive a money order representing the coinage at operation 712. Alternatively, at operation 714, the user may receive a cash card, receive value on an existing card, or receive a credit to an existing value account representing the coinage.

Figure 8:
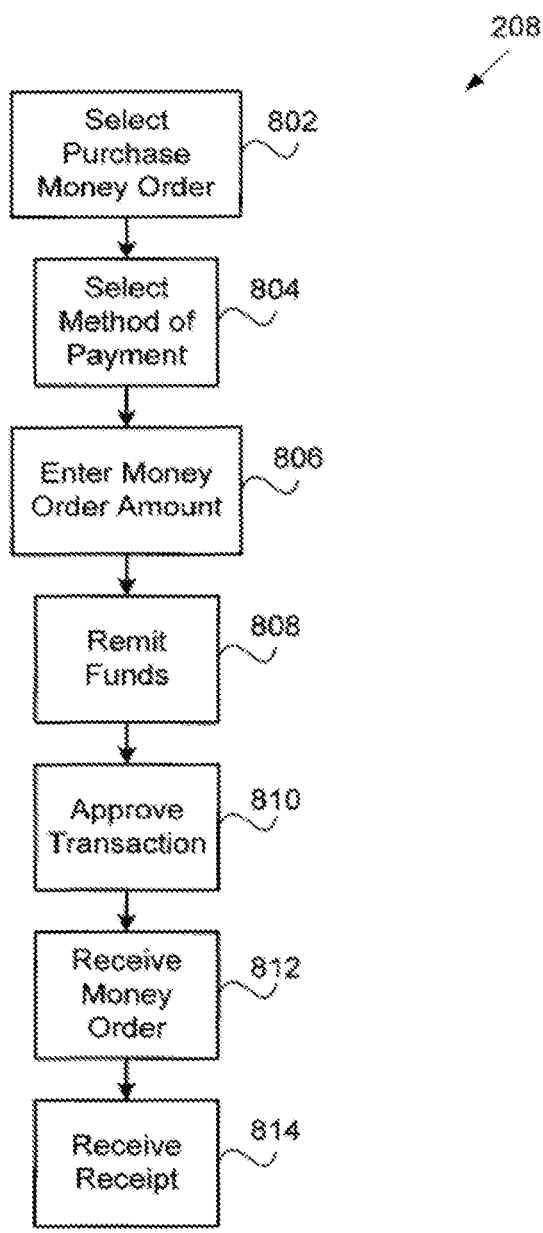
FIG. 8 illustrates a method of purchasing a money order according to embodiments of the invention, which method may use the kiosk of FIG. 1A.

FIG. 8 illustrates the receive money order operation 208 in greater detail. At operation 802, the user selects the purchase money order option. At operation 804, the user selects a method for paying for the money order. The user enters the amount of the money order at operation 806. At operation 808, the users remits the funds in a manner similar to that described with reference to operation 312 of FIG. 3. After the kiosk verifies the transaction, the user approves the transaction at operation 810 and receives the money order at operation 812. The user obtains a receipt at operation 814.

Figure 9:
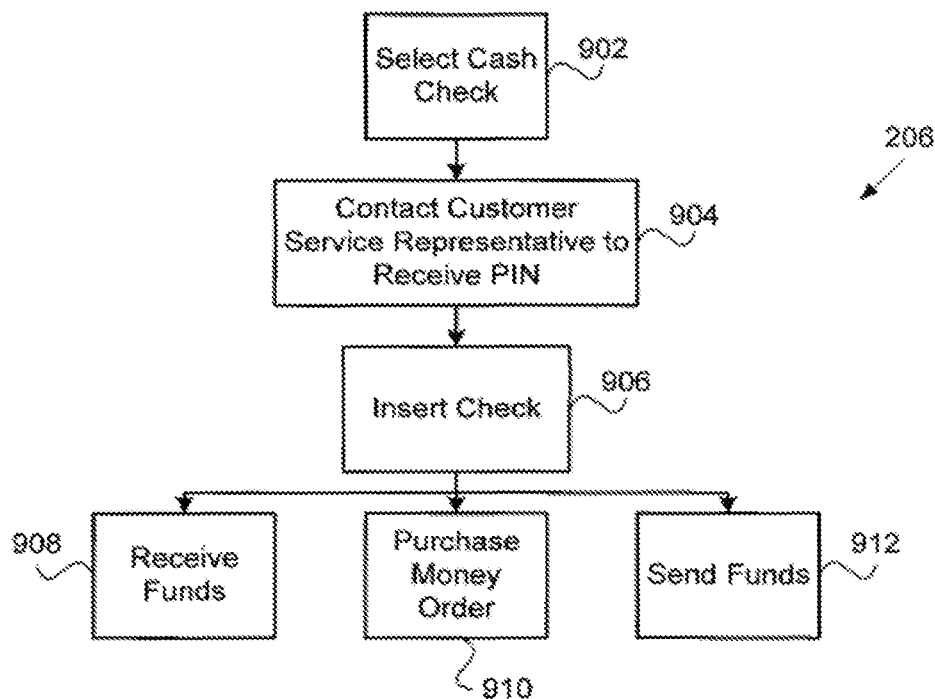
FIG. 9 illustrates a method of cashing a check according to embodiments of the invention, which method may use the kiosk of FIG. 1A.

FIG. 9 illustrates the cash check option 206 in greater detail. Cashing a check using the kiosk 100 includes a number of security and fraud risks similar to the well known risks of cashing checks generally (e.g., identification verification, forgery, insufficient funds, and the like). Thus, it may be the case that not all users can cash checks at kiosk 100 and/or that only certain types of checks may be cashed. Other options may include a delay period wherein the user's check is held until the funds are transferred to the kiosk operator. The present invention may include other well know security measures for mitigating the risks associated with providing cash in exchange for a check.

At operation 902 of FIG. 9, the user selects the cash check option. The user then contacts a customer service representative to approve the transaction and receive a PIN or other identifier. The user then inserts the check into the cash/check reader 118. It may be the case that only certain types of printed checks may be read by the cash/check reader 118. A MICR reader may be used to read the account number off the check, after which the kiosk communicates with a host system to verify the funds. The user may then receive the funds at operation 908, purchase a money order at operation 910, or send funds at operation 912.

Figure 10:
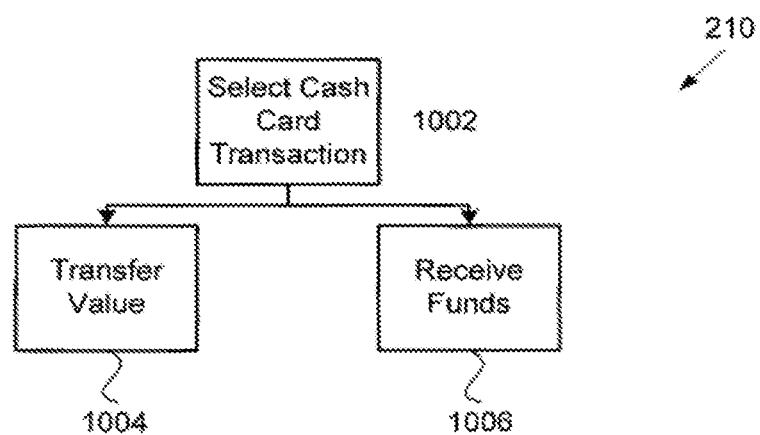
FIG. 10 illustrates a method of transacting using value cards according to embodiments of the invention, which method may use the kiosk of FIG. 1A.

FIG. 10 illustrates the value card transaction option 210 in more detail. For purposes of this discussion, a value card may include stored or representative value cards, and may include types of value other than Unites States currency. Some methods for exchanging value among such cards are more fully described in previously incorporated U.S. patent application Ser. No. 09/955,747, entitled "METHOD AND SYSTEM FOR TRANSFERRING STORED VALUE". The kiosk 100 may be used to transfer value among value cards or receive funds from value cards. Such transactions may also be accomplished via electronic terminals, such as hypercom terminals, not associated with the kiosk.

At operation 1002, the user selects the value card transaction option. If the user desires to transfer value among value cards, the user selects the transfer option at operation 1004. The user is then provided with a series of instructional display screens that direct the user to swipe the cards among which the user wishes to exchange value. Alternatively, the user may enter account information without swiping a card. During the process, the kiosk may communicate with a value exchange server, such at the exchange server 136 of FIG. 1B. For example, if the user is transferring value between value accounts having different units, the kiosk may send a request for an account balance to the exchange server 136 after receiving account information from a first account. In return, the exchange server may transmit information relating to the amount of value in the account. Further, after receiving the account information relating to the second account, the kiosk may send a request to the exchange server 136 seeking the exchange rate between the accounts. Then, the kiosk may present the information to the user and request the user to specify the amount of value to exchange. Alternatively, the kiosk may compile all the information for the transaction before sending the information to the exchange server, in which case the kiosk may store a file locally having the exchange rates between all possible value accounts. Other examples are possible.

If the user wishes to receive funds from a value card, the user selects the receive funds option at operation 1006. The user is then directed to swipe the card or enter account information from which to receive value and is prompted to enter the amount of value to receive from the account. If the user wishes to receive cash and the value account is in units other than dollars, the kiosk may contact the exchange server 136 to obtain the user's account balance and the exchange rate between the units of the account and cash. The user may also add funds to value cards in a similar manner.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to connect computing devices to a network and configure multiprocessors to control the operation of peripheral devices and communicate with other computers. Accordingly, the above description should not be taken as limiting the scope of the invention, which is defined in the following claims.

What is claimed is:

1. A multi-purpose kiosk comprising:
    a first network interface configured to connect to a first network;
    a second network interface configured to connect to a second network;
    a communication interface;
    a processing unit comprising one or more processors; and
    memory coupled with and readable by the processing unit and storing therein a set of instructions which, when executed by the processing unit, causes the multi-purpose kiosk to:
        receive, via the communication interface, a customer request by a recipient to receive value transferred from a sender, the value being associated with a unique identifier;
        determine whether the customer request includes a coinage amount;
        in response to determining that the customer request includes a coinage amount, determine whether the multi-purpose kiosk is equipped with a mechanism to dispense one or more coins;

determine that the multi-purpose kiosk is not equipped with the mechanism to dispense one or more coins; and based on the determination that the multi-purpose kiosk is not equipped with the mechanism to dispense one or more coins:

cause a plurality of options to be presented to the recipient on a display screen of the multi-purpose kiosk;

receive a selection from the recipient of one of the plurality of options; and based on the selection from the recipient of one or the plurality of options, cause a tangible item of value to be dispensed to the recipient via the multi-purpose kiosk.

2. The multi-purpose kiosk of claim 1, wherein the plurality of options include an option for receiving a money order for the coinage amount.

3. The multi-purpose kiosk of claim 2, wherein the set of instructions that, when executed by the processing unit, further cause the multi-purpose kiosk to, based on the selection of the option for receiving a money order for the coinage amount, cause a money order in an amount of a portion of the value to be dispensed via the multi-purpose kiosk.

4. The multi-purpose kiosk of claim 1, wherein the plurality of options include an option for a stored value card for the coinage amount.

5. The multi-purpose kiosk of claim 4, wherein the set of instructions that, when executed by the processing unit, further cause the multi-purpose kiosk to, based on the selection of the option for a stored value card for the coinage amount, cause a new cash card in an amount of a portion of the value to be dispensed via the multi-purpose kiosk.

6. The multi-purpose kiosk of claim 4, wherein the set of instructions that, when executed by the processing unit, further cause the multi-purpose kiosk to, based on the selection of the option for a stored value card for the coinage amount, cause the multi-purpose kiosk to receive a previously distributed cash card from the recipient and add, by the multi-purpose kiosk, an amount of a portion of the value to the previously distributed cash card.

7. The multi-purpose kiosk of claim 1, wherein the plurality of options include an option for receiving the coinage amount in a pre-existing value account associated with the recipient.

8. A computer-implemented method comprising:

receiving, at a multi-purpose kiosk, via a communication interface, a customer request by a recipient to receive value transferred from a sender, the value being associated with an unique identifier;

determining, by the multi-purpose kiosk, whether the customer request includes a coinage amount;

in response to determining that the customer request includes a coinage amount, determining, by the multi-purpose kiosk, whether the multi-purpose kiosk is equipped with a mechanism to dispense one or more coins;

determining, by the multi-purpose kiosk, that the multi-purpose kiosk is not equipped with the mechanism to dispense one or more coins; and based on the determination that the multi-purpose kiosk is not equipped with the mechanism to dispense one or more coins:

causing a plurality of options to be presented to the recipient on a display screen of the multi-purpose kiosk;

receiving, by the multi-purpose kiosk, a selection from the recipient of one of the plurality of options; and based on the selection from the recipient of one or the plurality of options, causing a tangible item of value to be dispensed to the recipient via the multi-purpose kiosk.

9. The computer-implemented method of claim 8, wherein the plurality of options include an option for receiving a money order for the coinage amount.

10. The computer-implemented method of claim 9, further comprising:

based on the selection of the option for receiving a money order for the coinage amount, causing a money order in an amount of a portion of the value to be dispensed via the multi-purpose kiosk.

11. The computer-implemented method of claim 8, wherein the plurality of options include an option for a stored value card for the coinage amount.

12. The computer-implemented method of claim 11, further comprising:

based on the selection of the option for a stored value card for the coinage amount, causing a new cash card in an amount of a portion of the value to be dispensed via the multi-purpose kiosk.

13. The computer-implemented method of claim 11, further comprising:

based on the selection of the option for a stored value card for the coinage amount, causing the multi-purpose kiosk to receive a previously distributed cash card from the recipient and adding, by the multi-purpose kiosk, an amount of a portion of the value to the previously distributed cash card.

14. The computer-implemented method of claim 8, wherein the plurality of options include an option for receiving the coinage amount in a pre-existing value account associated with the recipient.

15. A non-transitory, computer-readable storage medium having stored thereon instructions, which, when executed by one or more processing devices, cause the one or more processing devices to perform operations comprising:

receiving, via a communication interface, a customer request by a recipient to receive value transferred from a sender, the value being associated with an unique identifier;

determining whether the customer request includes a coinage amount;

in response to determining that the customer request includes a coinage amount, determining whether a multi-purpose kiosk is equipped with a mechanism to dispense one or more coins;

determining that the multi-purpose kiosk is not equipped with the mechanism to dispense one or more coins; and based on the determination that the multi-purpose kiosk is not equipped with the mechanism to dispense one or more coins:

causing a plurality of options to be presented to the recipient on a display screen of the multi-purpose kiosk;

receiving a selection from the recipient of one of the plurality of options; and based on the selection from the recipient of one or the plurality of options, causing a tangible item of value to be dispensed to the recipient via the multi-purpose kiosk.

16. The non-transitory, computer-readable storage medium of claim 15, wherein the plurality of options include an option for receiving a money order for the coinage amount.

17. The non-transitory, computer-readable storage medium of claim 16, the operations further comprising:
   based on the selection of the option for receiving a money order for the coinage amount, causing a money order in an amount of a portion of the value to be dispensed via the multi-purpose kiosk.

18. The non-transitory, computer-readable storage medium of claim 15, wherein the plurality of options include an option for a stored value card for the coinage amount.

19. The non-transitory, computer-readable storage medium of claim 18, the operations further comprising:
   based on the selection of the option for a stored value card for the coinage amount, causing a new cash card in an amount of a portion of the value to be dispensed via the multi-purpose kiosk.

20. The non-transitory, computer-readable storage medium of claim 18, the operations further comprising:
   based on the selection of the option for a stored value card for the coinage amount, causing the multi-purpose kiosk to receive a previously distributed cash card from the recipient and adding, by the multi-purpose kiosk, an amount of a portion of the value to the previously distributed cash card.

\* \* \* \* \*